US012698758B2

(12) United States Patent
Daboul et al.

(10) Patent No.: US 12,698,758 B2
(45) Date of Patent: Aug. 4, 2026

(54) METHOD FOR MONITORING THE TEMPERATURE OF A GENERATOR OF A WIND TURBINE

(71) Applicant: Wobben Properties GmbH, Aurich (DE)

(72) Inventors: Hussam Daboul, Südbrookmerland (DE); Rolf Ewen, Aurich (DE); Michael Müller, Südbrookmerland (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 2 days.

(21) Appl. No.: 19/045,091

(22) Filed: Feb. 4, 2025

(65) Prior Publication Data

US 2025/0250965 A1     Aug. 7, 2025

(30) Foreign Application Priority Data

Feb. 5, 2024    (EP) ..................................... 24155691

(51) Int. Cl.
    *F03D 17/00*        (2016.01)
    *F03D 7/04*         (2006.01)
(52) U.S. Cl.
    CPC ............. *F03D 17/018* (2023.08); *F03D 7/04* (2013.01); *F03D 17/036* (2023.08); *F05B 2270/402* (2013.01); *F05B 2270/8041* (2013.01)
(58) Field of Classification Search
    CPC ........ F03D 17/018; F03D 7/04; F03D 17/036; F05B 2270/402; Y02E 10/72; H02K 11/25; H02K 7/183
    See application file for complete search history.

(56) References Cited

U.S. PATENT DOCUMENTS

| | | | | |
|---|---|---|---|---|
| 4,563,667 A | * | 1/1986 | Hofsass | H01H 37/5427 |
| | | | | 337/349 |
| 5,193,080 A | * | 3/1993 | Mohri | G11B 11/10571 |
| 5,394,260 A | * | 2/1995 | Suzuki | G02F 1/0121 |
| | | | | 372/12 |
| 5,798,856 A | * | 8/1998 | Suzuki | H01S 5/0265 |
| | | | | 398/183 |
| 7,271,824 B2 | * | 9/2007 | Omori | G02B 26/122 |
| | | | | 347/249 |
| 7,995,198 B2 | * | 8/2011 | Sasaoka | G01B 11/18 |
| | | | | 356/73.1 |
| 8,421,580 B2 | * | 4/2013 | Takeda | H01H 37/46 |
| | | | | 337/380 |

(Continued)

FOREIGN PATENT DOCUMENTS

| | | | | |
|---|---|---|---|---|
| CN | 108348000 A | * | 7/2018 | A24D 3/02 |
| DE | 1139581 A | | 11/1962 | |

(Continued)

*Primary Examiner* — Pedro J Cuevas
(74) *Attorney, Agent, or Firm* — Polsinelli PC

(57)        ABSTRACT

A method is provided for monitoring the temperature of an electric generator of a wind turbine, wherein the generator has a stator, a rotor and a temperature monitoring unit. The temperature monitoring unit has a passive control element on the rotor and a receiving unit on the stator. A change in temperature on the rotor leads to a mechanical or optical change in the passive control element. The mechanical or optical change in the passive control element is acquired by the receiving unit on the stator.

13 Claims, 4 Drawing Sheets

(56) References Cited

U.S. PATENT DOCUMENTS

| | | | | |
|---|---|---|---|---|
| 8,519,816 | B2 * | 8/2013 | Takeda | H01H 37/5418 |
| | | | | 337/377 |
| 8,736,416 | B2 * | 5/2014 | Takeda | H01H 37/043 |
| | | | | 337/380 |
| 8,749,341 | B2 * | 6/2014 | Takeda | H01H 37/14 |
| | | | | 337/377 |
| 9,239,431 | B1 * | 1/2016 | Rakich | G02B 6/12007 |
| 9,566,754 | B2 * | 2/2017 | Olesen | B29C 66/1122 |
| 9,568,704 | B1 * | 2/2017 | Wong | G02B 7/028 |
| 9,601,293 | B2 * | 3/2017 | Takeda | H01H 61/01 |
| 10,281,336 | B2 * | 5/2019 | Hammond | G01K 3/005 |
| 10,295,739 | B2 * | 5/2019 | Lipson | G02B 6/2934 |
| 10,436,661 | B2 * | 10/2019 | Harsh | G01K 7/183 |
| 11,237,025 | B2 * | 2/2022 | Issa | G01H 9/004 |
| 11,447,343 | B2 * | 9/2022 | Kishore | G01K 5/483 |
| 11,815,373 | B2 * | 11/2023 | Issa | G01D 5/35361 |
| 11,872,156 | B2 * | 1/2024 | Telfort | A61B 5/01 |
| 11,893,450 | B2 * | 2/2024 | Moro | G06K 7/10801 |
| 11,923,097 | B2 * | 3/2024 | Daw | G21C 17/112 |
| 12,257,183 | B2 * | 3/2025 | Telfort | A61B 5/026 |
| 12,292,337 | B2 * | 5/2025 | Tetzloff | B62D 55/092 |
| 2003/0067533 | A1 * | 4/2003 | Omori | B41J 2/471 |
| | | | | 347/261 |
| 2004/0190593 | A1 * | 9/2004 | Ferguson | G01L 19/086 |
| | | | | 374/188 |
| 2006/0098712 | A1 * | 5/2006 | Ferguson | G01K 5/54 |
| | | | | 374/184 |
| 2006/0121229 | A1 * | 6/2006 | Nagae | G01K 11/12 |
| | | | | 374/E11.018 |
| 2006/0191919 | A1 * | 8/2006 | Cheu | A47J 36/2411 |
| | | | | 219/730 |
| 2007/0242127 | A1 * | 10/2007 | Omori | G02B 26/122 |
| | | | | 347/248 |
| 2010/0238427 | A1 * | 9/2010 | Sasaoka | G01K 11/32 |
| | | | | 356/73.1 |
| 2013/0136152 | A1 * | 5/2013 | Draeger | G01K 1/024 |
| | | | | 374/183 |
| 2013/0170991 | A1 * | 7/2013 | Olesen | B29C 66/54 |
| | | | | 374/161 |
| 2015/0168223 | A1 * | 6/2015 | Hammond | G09G 3/344 |
| | | | | 702/130 |
| 2017/0052341 | A1 * | 2/2017 | Wong | G01K 7/16 |
| 2017/0269036 | A1 * | 9/2017 | Foord | G01N 27/023 |
| 2018/0172535 | A1 * | 6/2018 | Harsh | G01K 13/02 |
| 2020/0060869 | A1 * | 2/2020 | Telfort | A61B 5/01 |
| 2020/0209020 | A1 * | 7/2020 | Issa | G01H 9/004 |
| 2021/0188565 | A1 * | 6/2021 | Kishore | B65G 43/02 |
| 2021/0398698 | A1 * | 12/2021 | Daw | G21C 17/112 |
| 2022/0113169 | A1 * | 4/2022 | Issa | G01B 11/18 |
| 2023/0033170 | A1 | 2/2023 | Urresty et al. | |
| 2023/0177293 | A1 * | 6/2023 | Moro | G06K 7/10722 |
| 2024/0201022 | A1 * | 6/2024 | Wearne | G01K 11/00 |
| 2024/0216168 | A1 * | 7/2024 | Telfort | A61F 7/02 |
| 2024/0410763 | A1 * | 12/2024 | Tetzloff | B62D 55/092 |
| 2025/0102575 | A1 * | 3/2025 | Putrams | G01R 31/3274 |
| 2025/0130121 | A1 * | 4/2025 | Gates | G01K 11/3206 |
| 2025/0152411 | A1 * | 5/2025 | Telfort | A61F 7/02 |

FOREIGN PATENT DOCUMENTS

| | | | | |
|---|---|---|---|---|
| DE | 10241428 A1 | 3/2004 | | |
| DE | 102018132743 A1 | 6/2020 | | |
| ES | 2740878 T3 * | 2/2020 | | A24D 3/02 |
| JP | 2011254581 A | 12/2011 | | |
| JP | 2019502369 A * | 1/2019 | | A24D 3/02 |
| KR | 20180088374 A * | 8/2018 | | A24D 3/02 |

* cited by examiner

METHOD FOR MONITORING THE TEMPERATURE OF A GENERATOR OF A WIND TURBINE

CROSS-REFERENCE TO RELATED APPLICATIONS

This application claims the benefit of priority to European application number 24155691.9 filed on Feb. 5, 2024, which is expressly incorporated by reference herein in its entirety.

TECHNICAL FIELD

The present disclosure relates to a method for monitoring the temperature of an electric generator of a wind turbine and an electric generator.

BACKGROUND

A wind turbine has an electric generator, which is used to generate electric energy from the kinetic energy of the wind. The electric generator has a rotor and a stator. During operation of the electric generator, electric losses may be converted into heat in the rotor and/or the stator. This may lead to an impermissible heating of the stator and/or the rotor of the generator. Therefore, it may make sense to monitor the temperature of the generator.

SUMMARY

Therefore, the object of the present disclosure is to provide a method for monitoring the temperature of a generator in a wind turbine and an electric generator.

This object is achieved by a method for monitoring the temperature of an electric generator of a wind turbine according to claim 1 and by an electric generator according to claim 9.

Therefore, provided is a method for monitoring the temperature of a generator of a wind turbine. The electric generator has a rotor and a stator. A generator gap is provided between the rotor and the stator. Further provided is a temperature monitoring unit, which is used to monitor a temperature in the area of the generator (in the area of the rotor or the stator). The temperature monitoring unit has a passive control element, which acquires a temperature in the area of the rotor. For example, a temperature change on the rotor triggers a mechanical or optical change in the control element. The temperature monitoring unit further has a receiving unit, which is provided in or on the stator, and detects a change in the temperature acquired by the passive control element. This makes it possible to transmit a signal without a slip ring between the rotor and the stator. This is advantageous, since a slip ring is error prone, and may be replaced after a time.

According to an example, the passive control element has a movable pin, the free length of which changes as a function of the temperature of the rotor at the location where the control element is arranged.

According to an example, the movable pin comes into contact with a contact surface of the receiving unit when the temperature of the rotor exceeds a threshold value and triggers a change in length of the movable pin.

According to an example, the movable pin has a magnetic element, and the receiving unit has a magnet sensor, which acquires an approach by the magnetic element of the control element.

According to an example, the receiving unit has an obstacle detection sensor, which is suitable for acquiring the movable pin by means of electromagnetic waves.

According to an example, the obstacle detection sensor is designed as an infrared or an ultrasound sensor.

According to an example, the passive control element has a temperature measuring strip which changes color as a function of the acquired temperature. The receiving unit has an optical sensor, such as a camera, in order to acquire the change in color of the temperature measuring strip (i.e., the optical change in the control element).

According to an example, a method for monitoring the temperature of a generator of a wind turbine is provided, wherein the generator has a stator and a rotor. A temperature of at least one section of the rotor is acquired by means of a temperature sensor, which is fastened to the stator.

The temperature monitoring unit can optionally have a control unit, which is equipped, based on the state of the passive control element acquired by the receiving unit, to conclude whether a temperature threshold value has been exceeded, and output a warning signal or intervene in the controller of the wind turbine (e.g., so as to activate cooling, reduce the speed or switch off or shut down the wind turbine).

The passive control unit can have a bimetal element or a thermostat. The passive control element reacts to the ambient temperature or to the temperature of the rotor and a change in temperature leads to a (mechanical) change in the passive control element. For example, this can be a change in length or shape. Alternatively thereto, the change can be a graphic or optical change (e.g., a temperature measuring strip).

The states of the passive control elements (which indicate the temperature) can be transmitted mechanically, wherein a change in length or shape of the control element initiates a contact on the stator side. This can be detected by the receiving unit and relayed to the control unit. Based on the mechanical contact that took place, it can there be concluded that the temperature has exceeded a threshold value in the area of the rotor where the control unit is provided.

Alternatively thereto, the state of the passive control element can be transmitted magnetically. For example, a reed sensor or a magnetic field-based sensor can be provided on or at the stator, for example. The control element can here have a magnet on a movable section. For example, a rise in temperature leads to a change in length of a pin of the control element, so that the magnet moves in the direction of the stator, and in some examples a magnet sensor (reed sensor). As a consequence, an approach can be acquired. An acquired approach makes it possible to conclude whether a temperature threshold value in the rotor has been exceeded.

According to an example, the receiving unit can have a wireless obstacle detection sensor, which detects when the passive control unit executes a change in length or shape as a reaction to a temperature change in the rotor of a wind turbine.

According to an example, the passive control unit can have at least one reversible temperature measuring strip, which changes color as a function of temperature. The receiving unit can then have a photodetector or a camera on the stator so as to acquire the temperature on the reversible temperature measuring strip.

According to an example, the receiving unit can be designed as an infrared temperature sensor, which is mounted on the stator side and acquires a temperature on a location of the rotor via infrared.

The temperatures acquired by the receiving unit of the temperature monitoring unit or the acquired exceeded threshold values can be relayed to a controller of the wind turbine, so as to introduce appropriate steps as appropriate.

According to an example, an electric generator is provided for a wind turbine, which has a rotor, a stator, a generator gap between the rotor and stator and a temperature monitoring unit, which has a passive control element on the rotor and a receiving unit on the stator. The passive control element is designed to execute or generate a mechanical or optical change given a change in temperature of the rotor. The receiving unit is de-signed to acquire a mechanical or optical change in the passive control element.

The electric generator can be a permanently excited synchronous generator, in which the rotor has permanent magnets for excitation (i.e., for generating a rotor magnetic field).

Additional configurations of the present disclosure are the subject of the subclaims.

BRIEF DESCRIPTION OF THE SEVERAL VIEWS OF THE DRA WINGS

Advantages and exemplary embodiments of the present disclosure will be described in more detail below with reference to the drawing.

Figure 3A:
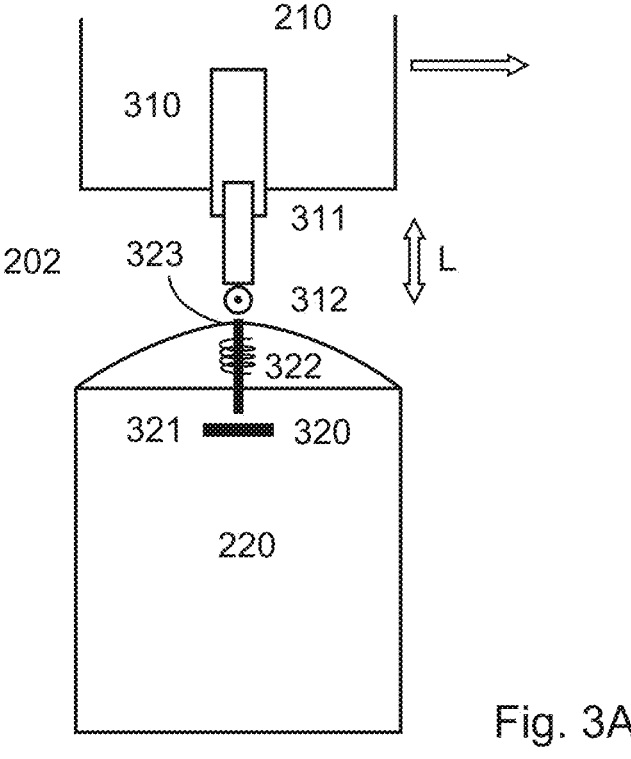
Figure 3B:
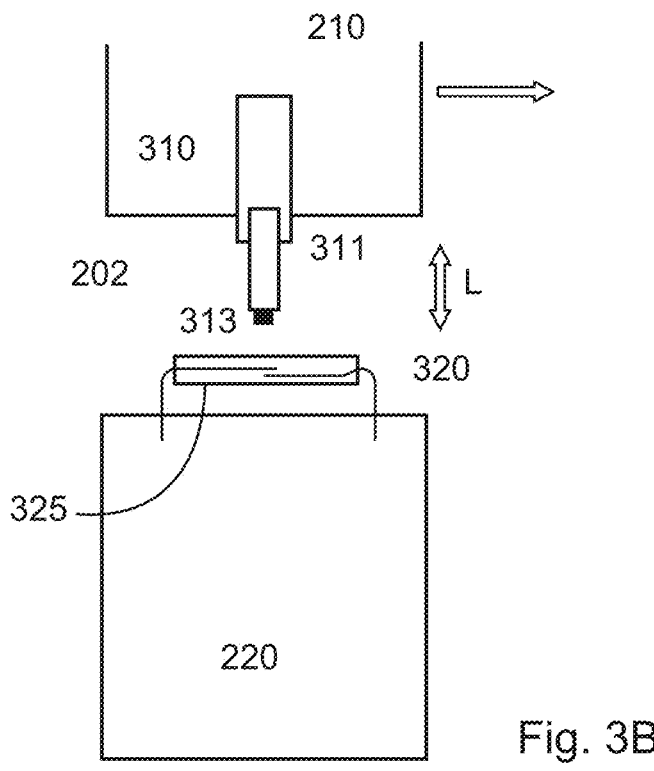
Figure 3C:
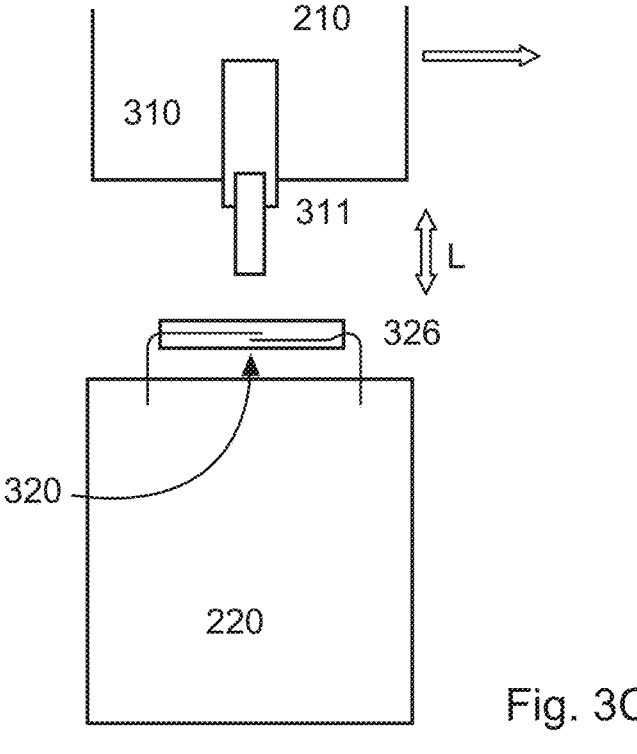
Figure 4:
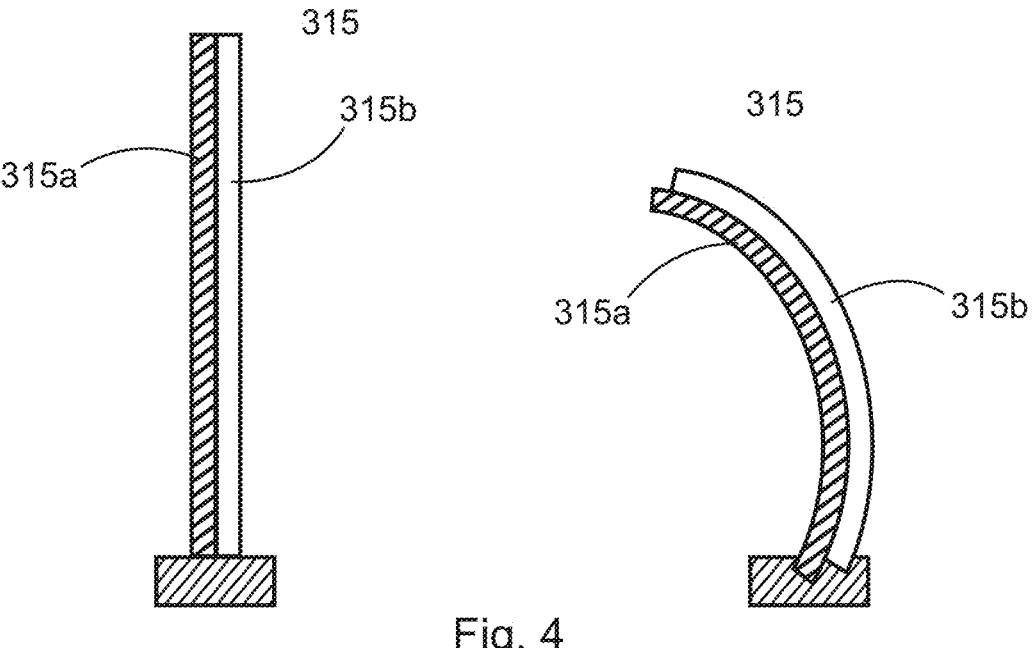
Figure 5:
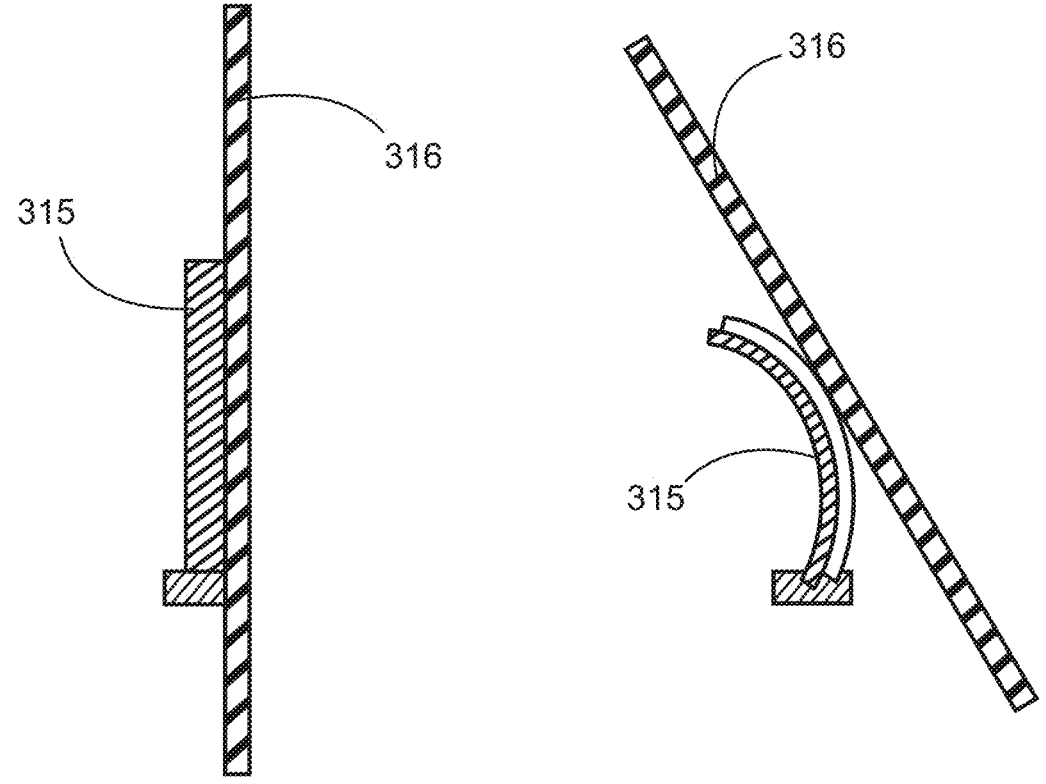

FIG. 3A to 3C each show a schematic sectional view of a generator of a wind turbine according to some aspects of the present disclosure;

FIG. 4 shows a schematic illustration of a passive control element with a bimetal element according to some aspects of the present disclosure; and FIG. 5 shows a schematic illustration of a passive control element according to some aspects of the present disclosure.

DETAILED DESCRIPTION

Figure 1:
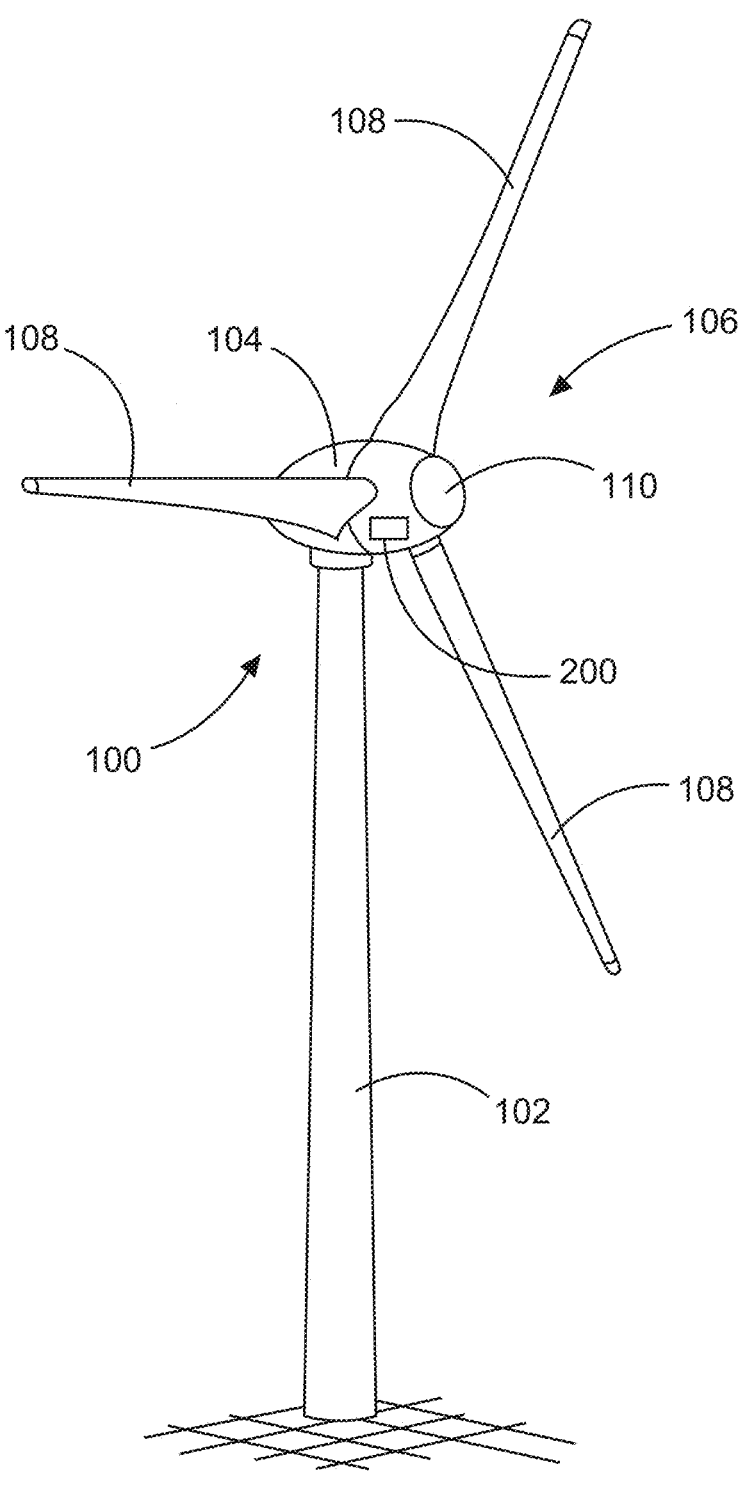
FIG. 1 shows a schematic illustration of a wind turbine according to some aspects of the present disclosure.

FIG. 1 shows a schematic illustration of a wind turbine. The wind turbine 100 has a tower 102 with a nacelle 104 and an aerodynamic rotor 106. The aerodynamic rotor 106 has three rotor blades 108 as well as a spinner 110. An electric generator 200 is located inside of the nacelle 104. A rotor of the electric generator 200 is coupled with the aero-dynamic rotor 106, either directly or by means of a gearbox. As the aerodynamic rotor 106 rotates, the rotor of the generator 200 is thus made to rotate. As a result, the generator 200 can generate electric energy.

Figure 2:
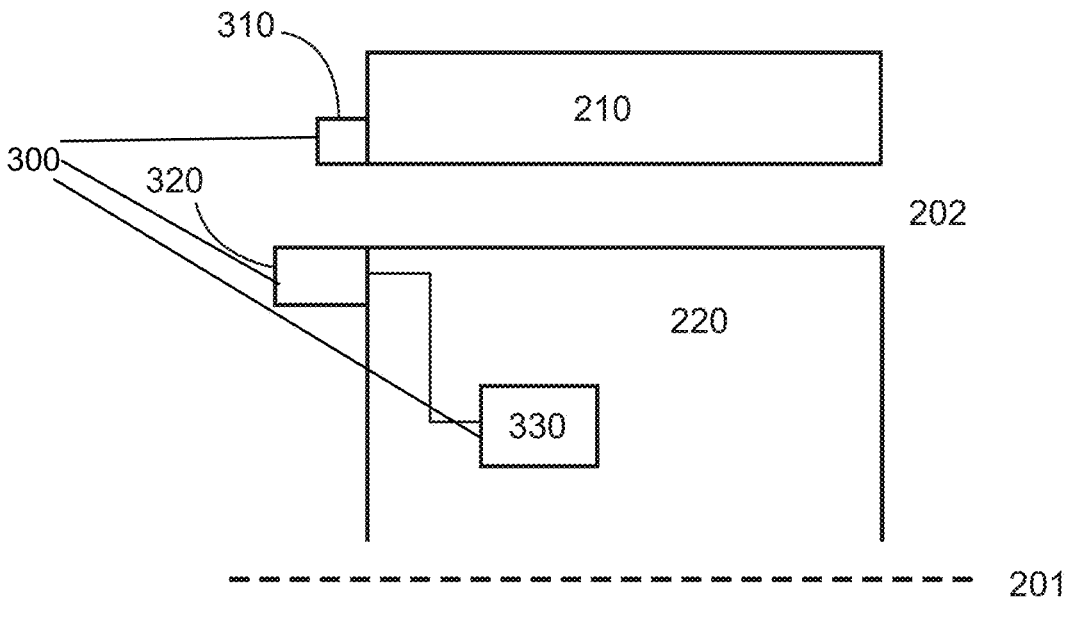
FIG. 2 shows a schematic sectional view of a generator of a wind turbine according to some aspects of the present disclosure.

FIG. 2 shows a schematic illustration of a generator of a wind turbine. The generator 200 has a rotor 210 and a stator 220. A generator gap 202 is provided between the rotor 210 and stator 220. The rotor 210 rotates around the axis of rotation 201.

A temperature monitoring unit 300 is provided for monitoring the temperature of the generator. The temperature monitoring unit 300 has a passive control element 310 and a receiving unit 320. The passive control element 310 is coupled with the rotor 210. The receiving unit 320 is coupled to the stator 220.

The temperature monitoring unit 300 can further have a control unit 330, which is coupled with the receiving unit 320. The passive control element 310 is able to acquire a temperature at least at one location of the rotor 210. A change in temperature of the rotor 210 leads to a change in the control element 310. The change in the control element 310 can trigger a mechanical expansion (given a rise in temperature) or a mechanical contraction (given a drop in temperature). The receiving unit 320 can acquire the change in the control element 310. If the change exceeds a threshold value, the control unit 330 can output a warning signal and/or intervene in a controller of the wind turbine.

The change in the passive control element 310 can be acquired by the receiving unit 320 mechanically, electrically, magnetically, optically and/or electromagnetically.

FIG. 3A to 3C each show a schematic sectional view of a generator of a wind turbine. FIG. 3A shows a mechanical acquisition, FIG. 3B shows a magnetic acquisition, and FIG. 3C shows an electromagnetic acquisition.

FIG. 3A provides a rotor 210 of the generator 200 with a control element 310, which has a movable pin 311. The passive control element 310 changes its mechanical shape during a change in temperature, e.g., by means of a change in length L of a movable pin 311. In other words, when the rotor 210 is heated, this is acquired by the passive control element 310 and converted into a change in the length L of the control element 310 or in the shape of a movable pin 311.

The stator 220 of the generator 200 has a receiving unit 320. The receiving unit 320 can have a mechanical contact detector 321. The contact detector 321 can have a pre-stressed element 322 and a contact surface 323.

An increase in temperature of the rotor 210 leads to a change in length of the control element 310, due to, for example, the extension of the movable pin 311. Once the change in temperature has exceeded a threshold value, this leads to a change in length, so that the movable pin 311 comes into mechanical contact with a contact surface 323 of the contact detector 321 on the stator 220.

The control element 310 can optionally have a wheel 312 at the free end of the movable pin 311. This is advantageous, since it reduces a mechanical friction between the ex-tended movable pin 311 and the contact surface 323 of the contact detector 321. The contact surface 323 can be prestressed by means of the prestressed element 322.

The extended movable pin 311 and the wheel 312 then come into contact with the con-tact surface 323, provided the temperature of the rotor has exceeded a corresponding threshold value. This contact presses the contact surface 323 inward, which is acquired by the contact detector 321.

On FIG. 3B, the electric generator 200 has a rotor 210 and a stator 220. Further provided is a temperature monitoring unit 300. The temperature monitoring unit 300 has a passive control element 310, which is provided on the rotor 210, and a receiving unit 320, which is provided on the stator 220.

The passive control element 310 has a movable pin 311 as well as a magnet 313 at the free end of the movable pin. A temperature increase of the rotor 210 triggers a change in length L of the control element 310, such as a change in the free length L of the movable pin 311.

The receiving unit 320 on the stator 220 can be designed like a magnetic sensor 325, for example in the form of a reed sensor. If the magnet 313 is moved close enough to the magnetic sensor 325, this approach is detected, and this information is relayed to the control unit 330.

On FIG. 3C, the receiving unit 320 is designed as an obstacle detection sensor 326 (e.g., as an infrared or ultra-sound sensor).

The length of the movable pin 311 is correlated with a temperature of the rotor 210. By acquiring the length of the movable pin 311, inferences can thus be made about the temperature of the rotor 310, so as to avoid overheating.

FIG. 4 shows a schematic illustration of a passive control element with a bimaterial element. FIG. 4 shows a bimaterial element. The bimaterial element 315 has two sections 315a, 315b with different heat expansion coefficients. As a result, the two sections 315a, 315b expand differently when heated, which as shown on FIG. 5 leads to a change in the shape of the bimaterial element. The bimaterial element is typically designed as a bimetal element.

FIG. 5 shows a schematic illustration of a passive control element. On FIG. 6, a bar 316 is coupled to a bimaterial element 315. Given a change in temperature, this then leads to a change in the angle of the bar 316.

According to an example, the temperature of the rotor can be monitored by means of the temperature monitoring unit 300. The temperature information can here be mechanically transmitted from a control element to the receiving element. The control element con-verts a change in temperature into a change in shape or angle. For example, this can take place in the form of a bimetal element or in the form of a thermostat. The thermo-stat can have a fluid which expands given an increase in temperature. The expansion of the fluid can then trigger a change in length of a pin. The change in length of the pin can take place by pushing out a pin, for example.

FIG. 3A shows an example of mechanical transmission. A magnetic transmission can take place as an alternative to mechanical transmission. This is shown on FIG. 3B. The magnetic sensor 325 makes it possible to acquire a contact or approach by the movable pin, whose free end is provided with a magnet.

According to an example (FIG. 3C), an obstacle detection sensor can be provided as the receiving unit. For example, the obstacle detection sensor can be designed as an infra-red or ultrasound sensor. Given an approach by the movable pin of the control element, the obstacle detection sensor can detect an approach and output a warning signal.

According to another aspect, a reversible temperature measuring strip can be provided on the rotor. A corresponding camera can be provided on the stator, which can acquire the temperature value and output a corresponding warning.

According to an alternative example, an infrared temperature sensor is provided on the stator. This infrared temperature sensor can be aligned on the rotor, and can acquire the temperature of the rotor. Once the temperature of the rotor has exceeded a threshold value, the infrared temperature sensor can then output a warning signal.

| Reference List | |
| --- | --- |
| 100 | Wind turbine |
| 102 | Tower |
| 104 | Nacelle |
| 106 | Aerodynamic rotor |
| 110 | Spinner |
| 200 | Electric generator |
| 201 | Axis of rotation |
| 202 | Generator gap |
| 210 | Rotor |
| 220 | Stator |
| 300 | Temperature monitoring unit |
| 310 | Passive control element |
| 311 | Movable pin |
| 312 | Wheel |
| 313 | Magnet |
| 315 | Bimaterial element |
| 315a, 315b | Sections |
| 316 | Bar |
| 320 | Receiving unit |
| 321 | Contact detector |

-continued

| Reference List | |
| --- | --- |
| 322 | Prestressed element |
| 323 | Contact surface |
| 325 | Magnetic sensor |
| 326 | Obstacle detection sensor |
| 330 | Control unit |
| L | Length |

What is claimed is:

1. A method for monitoring a temperature of an electric generator of a wind turbine, wherein the generator has a stator, a rotor and a temperature monitoring unit, wherein the temperature monitoring unit has a passive control element on the rotor and a receiving unit on the stator, the method comprising:

detecting, by the receiving unit, a mechanical or optical change in the passive control element, wherein the mechanical or optical change is triggered based on a change in a temperature of the rotor;

determining that the mechanical or optical change in the passive control element exceeds a threshold; and generating a warning sign indicative of the mechanical or optical change in the passive control element, wherein the passive control element has a movable pin, the movable ping having an associated length that changes as a function of the temperature of the rotor, and the movable pin comes into contact with a contact surface of the receiving unit when the temperature of the rotor exceeds the threshold.

2. The method according to claim 1, wherein the movable pin has a magnetic element and the receiving unit has a magnetic sensor contact by the magnetic element of the control element.

3. The method according to claim 1, wherein the receiving unit has an obstacle detection sensor that detects the movable pin using electromagnetic waves.

4. The method according to claim 3, wherein the obstacle detection sensor is an infrared sensor.

5. The method according to claim 1, wherein the passive control element has a temperature measuring strip which changes color as a function of the temperature, and the receiving unit has an optical sensor for detecting a change in the color of the temperature measuring strip.

6. The method according to claim 5, wherein the optical sensor is a camera.

7. An electric generator for a wind turbine, comprising:

a rotor;

a stator;

a generator gap between the rotor and the stator; and a temperature monitoring unit having a passive control element on the rotor and a receiving unit on the stator, wherein the temperature monitoring unit is configured to:

detect a mechanical or optical change in the passive control element, wherein the mechanical or optical change is triggered based on a change in a temperature of the rotor;

determine that the mechanical or optical change in the passive control element exceeds a threshold; and generate a warning sign indicative of the mechanical or optical change in the passive control element, wherein the passive control element has a movable pin that is configured to change in length as a function of the temperature of the rotor, and the receiving unit has a mechanical contact detector.

8. The electric generator according to claim 7, wherein the movable pin has a magnetic element that is configured to cause the change in the length of the movable pin, and the receiving unit has a magnetic sensor configured to magnetically detect a contact by the magnetic element.

9. The electric generator according to claim 7, wherein the receiving unit has an obstacle detection sensor, and the obstacle detection sensor is configured to detect a contact by the movable pin.

10. The electric generator according to claim 7, wherein the generator represents a permanently excited synchronous generator.

11. The electric generator according to claim 7, wherein the movable pin comes into contact with a contact surface of the receiving unit when the temperature of the rotor exceeds the threshold.

12. The electric generator according to claim 7, wherein the passive control element has a temperature measuring strip which changes color as a function of the temperature, and the receiving unit has an optical sensor for detecting a change in the color of the temperature measuring strip.

13. The electric generator according to claim 12, wherein the optical sensor is a camera.

\*   \*   \*   \*   \*